(12) United States Patent
Zwinkels (10) Patent No.: US 9,567,911 B2
(45) Date of Patent: Feb. 14, 2017

(54) POWER PLANT AND METHOD FOR GENERATING ELECTRICAL POWER

(71) Applicant: LUMENION AG, Zug (CH)

(72) Inventor: Andrew Zwinkels, Berlin (DE)

(73) Assignee: Lumenion AG, Zug (CH)

( * ) Notice: Subject to any disclaimer, the term of this patent is extended or adjusted under 35 U.S.C. 154(b) by 433 days.

(21) Appl. No.: 14/094,477

(22) Filed: Dec. 2, 2013

(65) Prior Publication Data

US 2014/0150441 A1    Jun. 5, 2014

(30) Foreign Application Priority Data

Nov. 30, 2012   (EP) ..................... 12008052

(51) Int. Cl.
   *F02C 7/22*     (2006.01)
   *F02C 7/224*    (2006.01)
   *F01K 3/18*     (2006.01)
   *F22B 33/18*    (2006.01)
   *F22B 35/00*    (2006.01)

(52) U.S. Cl.
   CPC .............. *F02C 7/224* (2013.01); *F01K 3/186* (2013.01); *F22B 33/18* (2013.01); *F22B 35/00* (2013.01)

(58) Field of Classification Search
   CPC .............. F02C 7/224; F02C 7/08; F02C 7/10; F02C 3/26; F02C 3/28; F01K 3/186; F01K 3/20205; F01K 23/06; F01K 23/061; F01K 23/067; F01K 23/08
   See application file for complete search history.

(56) References Cited

U.S. PATENT DOCUMENTS 4,158,145 A * 6/1979 Kartsounes .............. F02C 3/28
                                                  290/52
4,262,482 A * 4/1981 Roffe ..................... F02C 7/224
                                                  431/247

(Continued)

FOREIGN PATENT DOCUMENTS

EP    1992794 A1    11/2008
FR    2311177 A2    12/1976

(Continued)

OTHER PUBLICATIONS

The European search report issued on Jun. 11, 2013, which corresponds to EP12008052.0 and is related to U.S. Appl. No. 14/094,477.

(Continued)

*Primary Examiner* — Andrew Nguyen
(74) *Attorney, Agent, or Firm* — Studebaker & Brackett PC (57) ABSTRACT

The present invention relates to a power plant for generating electrical power having a burner unit, wherein thermal energy can be produced by burning a fuel, a turbine unit, wherein a rotational movement can be produced with the thermal energy, and a generator unit which is driven by the rotational movement to generate electrical power. The power plant is characterized according to the invention in that in order to produce the thermal energy, in addition to the burner unit, an electric heating unit is provided, through which electrical energy can be converted into thermal energy to drive the turbine unit. In addition the invention relates to a method for generating electrical power.

13 Claims, 5 Drawing Sheets

(56) References Cited

U.S. PATENT DOCUMENTS

| | | | | |
|---|---|---|---|---|
| 4,503,305 A | * | 3/1985 | Virgin | B24B 49/105 |
| | | | | 219/630 |
| 7,621,117 B2 | * | 11/2009 | Dooley | F01D 15/10 |
| | | | | 60/226.1 |
| 2003/0177767 A1 | * | 9/2003 | Keller-Sornig | F02C 6/16 |
| | | | | 60/727 |
| 2005/0229599 A1 | | 10/2005 | Smith | |
| 2009/0056341 A1 | | 3/2009 | Sanchez et al. | |
| 2010/0229561 A1 | * | 9/2010 | Bland | F23R 3/346 |
| | | | | 60/747 |
| 2010/0313564 A1 | | 12/2010 | Glos et al. | |
| 2010/0319355 A1 | * | 12/2010 | Prabhu | F02C 7/224 |
| | | | | 60/772 |
| 2011/0011057 A1 | | 1/2011 | Bellows | |
| 2011/0083443 A1 | | 4/2011 | Jockenhoevel et al. | |

FOREIGN PATENT DOCUMENTS

| | | | | |
|---|---|---|---|---|
| GB | 1131042 | * | 10/1968 | F02C 7/266 |
| JP | H03-907 A | | 1/1991 | |

OTHER PUBLICATIONS

A Notice of Acceptance issued by the Australian Patent Office on Jul. 7, 2016, which corresponds to Australian Patent Application No. 2013257421 and is related to U.S. Appl. No. 14/094,477.

* cited by examiner

POWER PLANT AND METHOD FOR GENERATING ELECTRICAL POWER

BACKGROUND OF THE INVENTION

Field of the Invention

The present invention relates in a first aspect to a power plant for generating electrical power according to the preamble of claim 1. According to a further aspect the invention relates to a method for generating electrical power according to the preamble of claim 14.

Description of Related Art

A generic power plant has a burner unit, in which thermal energy can be produced by burning a fuel, a turbine unit, in which a rotational movement can be produced with the thermal energy, and a generator unit which is driven by the rotational movement to generate electrical power.

According to a generic method for generating electrical power a fuel is burnt in a burner unit, thermal energy is produced and the thermal energy is converted in a turbine unit into a rotational movement. A generator unit is driven by the rotational movement and electrical power is hereby generated.

In numerous countries, electrical power is produced mainly with power plants of the aforementioned type. Depending upon the power plant, the fuels used can comprise different, in particular fossil, energy carriers. For example, coal, gas or oil can be used as fuel.

A growing proportion of the total amount of power generated is covered by renewable energy sources. In particular, solar energy and wind energy are increasingly used to generate power. However, the amount of energy hereby produced fluctuates greatly over time. There are scarcely any possibilities for storing on a large scale the superfluous electrical energy hereby produced. This results in serious problems regarding how superfluous electrical energy is to be used. It is not rare in times of increased power generation to even pay a consumer of electrical energy.

In principle it is conceivable to power down the aforementioned power plant during an increased power generation through solar or wind energy. Powering down and re-starting the power plant are, however, associated with a high material burden and can only be carried out slowly with known power plants. These speeds are not sufficient to be able to efficiently react to a fluctuating amount of wind or solar radiation.

BRIEF SUMMARY OF THE INVENTION

It can thus be regarded as an object of the invention to indicate a method for generating electrical power and a power plant which facilitate an efficient adaptation to fluctuations in the amount of electrical power available.

This object is achieved through the power plant having the features of claim 1 and through the method having the features of claim 14.

Advantageous variants of the power plant according to the invention and the method according to the invention are the subject matter of the dependent claims and are explained in the following description.

It is provided in the power plant of the abovementioned type according to the invention that for the production of thermal energy an electric heating unit is provided in addition to the burner unit. The heating unit can convert electrical energy into thermal energy to drive the turbine unit.

According to a method of the above-described type the thermal energy is produced according to invention not only through the burner unit but also through an electric heating unit, through which electrical energy is converted into thermal energy to drive the turbine unit.

It can be regarded as a fundamental idea of the invention to use electrical energy to drive a turbine unit and an associated generator unit. For this purpose the electrical energy is converted into thermal energy. It is thereby possible to adjust the proportions with which the turbine unit is driven by thermal energy from the burner unit and thermal energy from the electric heating unit.

It is hereby possible as a particular advantage to vary the amount of fuel supplied to the burner unit without the turbine unit and the generator unit being substantially influenced. It is thereby possible for the amount of fuel burnt at a given moment to be rapidly varied. In the case of an over-supply of electrical energy it is thus possible to rapidly adapt the amount of fuel currently being burnt.

Advantageously, in times of increased power generation through wind or solar energy the available power can also be meaningfully used. In comparison with conventional power plants it can be ensured in such cases that as a result the remaining amount of fuel is higher. The power plant according to the invention can thus also be described as an energy storage unit. In case of an over-supply of electrical energy, energy can be stored by consuming less fuel. In comparison with known power plants also the total amount of emitted $CO_2$ is reduced.

It is particularly preferred to provide a control unit which, in case of an over-supply of electrical energy, increases a heating power of the electric heating unit and reduces a heating power of the burner unit. The presence of an over-supply can be either manually input to the control unit or can also be automatically determined by the control unit using certain criteria, for example by means of a momentary price of electrical power. Conversion losses are indeed necessarily associated with the conversion of electrical power into thermal energy, further into a rotational movement and finally, with the generator unit, into electrical energy again. Since, however, it is hereby possible to save available fuel, a large proportion of the available electrical energy is still meaningfully used.

Correspondingly, the control unit can reduce the heating power of the electric heating unit or switch off the heating unit if there is no longer an over-supply of electrical energy or if the power price increases. In case of falling heating power of the electric heating unit, the heating power of the burner unit can be increased again.

The control unit preferably allows the heating powers of the heating unit and the burner unit to be controlled in dependence upon each other so that the turbine unit can be operated with a constant or substantially constant total power. In particular the total power can remain constant within predefined limits through the control unit. In addition the heating powers can be controlled in dependence upon a fill level of a storage vessel which will be described in greater detail below. Alternatively to a constant total power, the heating powers of the heating unit and burner unit can also be controlled with the control unit in such a way that a predefined rate of change in the total power of the turbine unit is not exceeded.

The burner unit can usefully have a combustion chamber for combusting the fuel. The combustion chamber can thereby have a plurality of inlet ports, wherein a feed line for fuel is connected to at least one of the inlet ports. According to a preferred embodiment of the power plant according to the invention, the supply of a medium heated by the electric heating unit is facilitated by means of at least one other of the inlet ports. A reduction in the thermal energy resulting from a reduced fuel supply can thus be partially or completely compensated in the combustion chamber by thermal energy being increasingly introduced by the electric heating unit. The temperature in the combustion chamber is thereby extensively independent of changes in the amount of fuel supplied. Strains on the combustion chamber caused by temperature fluctuations are advantageously thereby reduced. More rapid changes in the amount of fuel burnt at a given moment can hereby be realised.

For this purpose the amount of fuel supplied and the amount of the medium heated in the electric heating unit can be controlled through the control unit in dependence upon each other so that the temperature in the combustion chamber is substantially constant. In particular the control unit can enable, in case of a reduction in the fuel supply, the temperature to remain constant within predefinable limits and/or can ensure that a predefined temperature change rate is not exceeded, whereby this is achieved by an increased heating power of the electric heating unit.

The electric heating unit can be formed in principle in any desired way provided that a medium is heated by electrical energy. This can be a liquid or a gas. The electric heating unit preferably has a plasma torch for heating a medium, with which the turbine unit can be driven. In the case of a plasma torch, a gas is converted into a plasma and the plasma is accelerated with the aid of an electric field, whereby the thermal energy thereof increases. It is hereby advantageous that temperatures can be rapidly reached which are similar to a temperature in the combustion chamber. In addition a plasma torch can have a compact structure and thereby be suitable for subsequent fitting to conventional power plants.

The plasma torch is preferably arranged on one of the inlet ports of the combustion chamber. The medium heated by the plasma torch is thereby directly output into the combustion chamber. Heat losses are thereby avoided in comparison with situations in which the plasma torch and the combustion chamber are arranged spatially apart from each other. In principle, other designs of electric heating units can also be arranged on one of the inlet ports.

More variable application possibilities are achieved if an inlet port for a fuel supply line and an inlet port for connection to the electric heating unit are formed equally. Advantageously it is hereby possible to subsequently upgrade conventional power plants in a simple manner. It can suffice in particular for this purpose to connect a plasma torch or another electric heating unit to one of the inlet ports of the combustion chamber instead of a fuel supply line. Furthermore this configuration allows greater variability in the amount of fuel supplied and the amount of thermal energy supplied via the electrical heating unit. For this purpose, connections of the inlet ports can be variably changed with either the fuel supply line or with plasma torches.

This configuration is particularly advantageous if a plurality of electric heating units are provided. Apart from a parallel arrangement of the electric heating units, a serial arrangement can also be provided. The possible temperature range is hereby increased, within which a medium to be heated can be heated.

The heating power and/or a temperature of the medium which is to be heated with the electric heating unit can be adjusted to be particularly flexible if the heating unit has heating elements in cascade form which can be individually controlled via the control unit. A cascade-type arrangement can be understood to mean that the corresponding heating elements are arranged one beside the other or one behind the other. As they are individually controllable, that is to say can be switched on and off, a heating power can be varied in a simple way.

Alternatively or additionally to the plasma torch, the electric heating unit can also have an induction means to heat a medium. The induction means can preferably be controlled with the control unit by changing a magnetic resistance on the induction means. The induction means can for example comprise a coil. This produces a magnetic field which is fed via a conductive material to the medium to be heated. The control unit can vary an air gap on the conductive material, whereby the magnetic resistance is adjusted. The power supplied to the medium to be heated is thereby easily controlled.

The process can take place even more efficiently in case of fluctuations in the available electrical energy if a storage vessel is provided. A medium can be stored therein which has been heated by the electric heating unit. A discharge line is provided, with which the heated medium can be conveyed from the storage vessel to the combustion chamber and/or the turbine unit. The control unit can hereby advantageously control—in the case of an over-supply of electrical energy—an additional storage of the superfluous electrical energy as thermal energy in the storage vessel.

By way of a further advantage the storage vessel can serve to bridge a temporary interruption in the consumption of electrical energy through the electric heating unit. For this purpose the control unit can trigger a discharge of the heated medium from the storage vessel if a heating power of the electric heating unit is reduced. This can be the case as soon as there is no longer an over-supply of electrical energy.

It can preferably be variably set with the control unit whether a heated medium is conveyed from the electric heating unit to the storage vessel or to the combustion chamber or turbine. In order to convey it to the combustion chamber or turbine the heated medium can be conveyed in particular from the electric heating unit to the discharge line of the storage vessel which leads to the combustion chamber or turbine.

The storage vessel also advantageously allows necessary rapid adaptations of the amount of fuel supplied to be avoided if the heating power of the electric heating unit is varied. It can thus be provided that the control unit—in the case of a change in the heating power of the electric heating unit—initially conveys the heated medium into or out of the storage vessel and thereby keeps constant the amount of fuel supplied to the burner unit. It is hereby also possible to operate the turbine unit with a substantially constant total power.

Increasing the amount of fuel supplied to the burner unit advantageously does not take place here already when the heating power of the electric heating unit is reduced. Instead, the amount of fuel is increased only when a fill level in the storage vessel falls below a predefinable threshold value or to zero.

The control unit is preferably adapted—in the case of a reduction in the heating power of the electric heating unit below a predefinable threshold or to zero—to trigger a supply of the heated medium from the storage vessel. Likewise, a supply is triggered if a predefined maximum fill level of the storage vessel is reached. In this case the amount of fuel supplied to the burner unit is simultaneously reduced. The turbine unit can thereby be further operated with substantially constant total power. A change in the heating power of the electric heating unit is not required in this case.

A particularly simple subsequent adaptation of conventional power plants is facilitated in an embodiment, in which it is provided that the burner unit and the electric heating unit each comprise an outlet line, in that the two outlet lines are connected to each other to form a joint outlet line and the joint outlet line leads to the turbine unit. According to this embodiment, no changes to the burner unit and the turbine unit of a conventional power plant are advantageously required. Instead it is essentially sufficient for the electric heating unit to be connected to the discharge line of the burner unit.

BRIEF DESCRIPTION OF THE DRAWINGS

Further features and advantages are described by reference to the attached schematic drawings, in which.

Similar components and those working similarly are generally provided with the same reference symbols in the drawing.

DETAILED DESCRIPTION OF THE INVENTION

Figure 1:
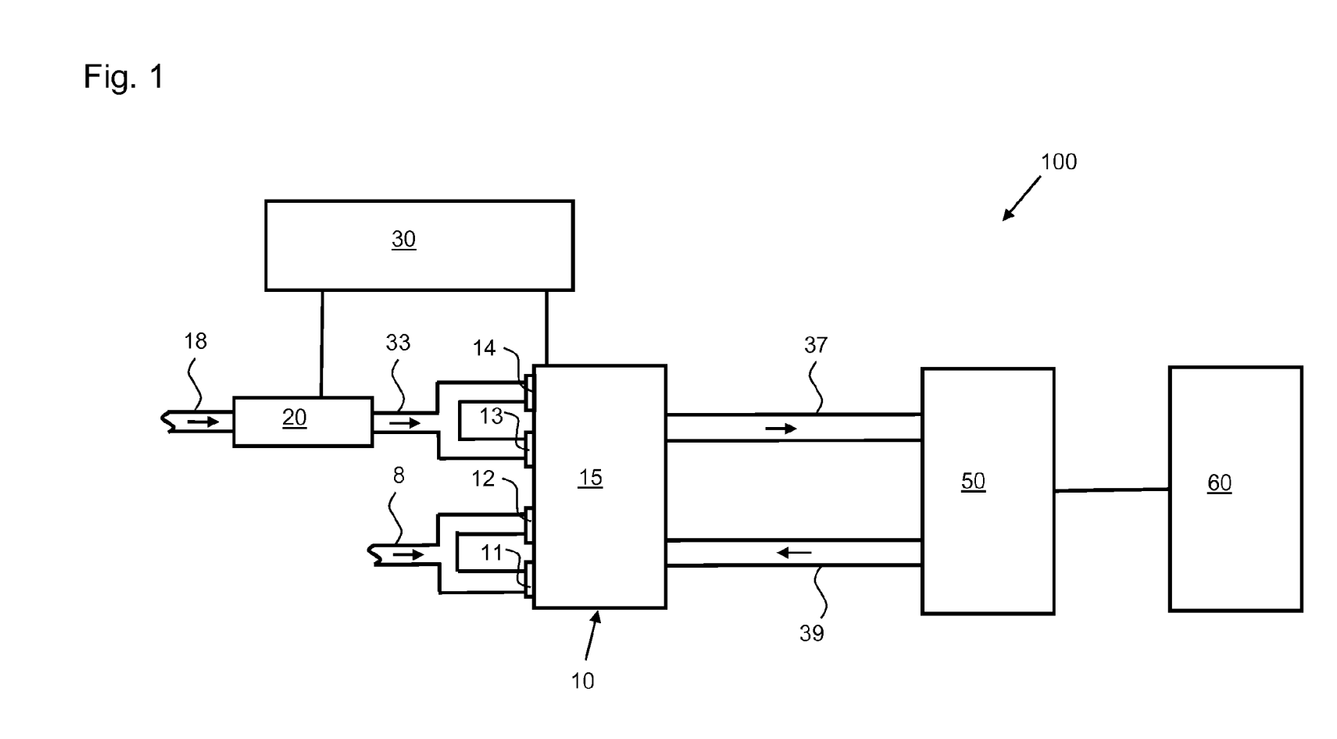
FIG. 1 shows a schematic representation of an embodiment of a power plant according to the invention.

FIG. 1 shows schematically an embodiment of a power plant 100. This comprises as essential components a burner unit 10, a turbine unit 50, a generator unit 60 and an electric heating unit 20.

The burner unit 10 has a combustion chamber 15. Fuel can be introduced into the combustion chamber 15 via a feed line 8 which leads to a plurality of inlet ports 11, 12 of the combustion chamber 15. By burning the fuel the temperature of the medium in the combustion chamber 15 increases.

The heated medium can then be conveyed via an outlet line 37 to the turbine unit 50. The turbine unit 50 is thus driven, wherein thermal energy of the heated medium is converted into a rotational movement of components of the turbine unit 50. Electrical power is generated in the generator unit 60 through the rotational movement. This can then be transferred to an external power network.

After flowing through the turbine unit 50 the heated medium is fed back via a return line 39 in the direction of the combustion chamber 15. It can hereby usefully pass through further components (not shown in greater detail here), for example a condenser and a pump.

In principle the temperature and the flow rate of the heated medium through the turbine unit 50 should be approximately constant. In case of powering up and down the turbine unit 50 a predefined maximum rate of change should not be exceeded. It is also desirable for the conditions in the combustion chamber 15 to be as constant as possible over time. This means that the temperature and output quantity of the heated medium from the combustion chamber 15 should not exceed a predefined maximum rate of change.

In the case of conventional power plants therefore the amount of fuel introduced into the combustion chamber 15 can be changed only slowly. Known power plants cannot therefore react, or can scarcely react, to fluctuations in the available electrical energy produced by renewable energy sources. This leads to an over-supply of electrical energy which it has scarcely been possible to meaningfully use to date.

In the case of the power plant 100 according to the invention on the other hand the amount of fuel introduced into the combustion chamber 15 can be changed rapidly over time.

This is achieved with an electric heating unit 20 which uses electrical energy to heat a medium. The electrical energy can be supplied from an external power network. An over-supply of electrical energy can thereby be used.

The medium to be heated, for example air, is introduced via a supply line 18 into the electric heating unit 20 and is heated there. The heated medium is then output via an outlet line 33 in the direction of the turbine unit 50.

A control unit 30 can control the amount of fuel supplied and the heating power of the electric heating unit 20, that is to say the electrical energy fed to the electric heating unit, in dependence upon each other. In particular the control unit 30 can increase the heating power of the electric heating unit in the case of a reduction in the amount of fuel supplied, and vice versa. The turbine unit 50 can thus be operated under substantially constant conditions.

An increase in the heating power of the electric heating unit 20 can be provided in particular in the case of an over-supply of electrical energy. In these cases, electrical energy can be taken from an external power network at favourable prices. In principle a switchable electrical connection can be provided from the generator unit 60 to the electric heating unit 20. In contrast with taking power from an external power network, it is thereby possible for power losses of the electrical energy to be kept particularly low. By using the over-supply of electrical energy the combustion rate of fuel can be reduced. Fuel is thereby advantageously spared. Costs for the fuel are thereby advantageously saved and $CO_2$ emissions through combustion of the fuel can be reduced.

In the embodiment shown in FIG. 1 the outlet line 33 of the electric heating unit 20 leads to inlet ports 13, 14 of the combustion chamber 15. A reduced fuel supply can hereby be compensated in the combustion chamber 15 by an increased supply of the medium heated by the electric heating unit 20. Conditions, for example pressure and temperature in the combustion chamber 15, can thereby be kept substantially constant if the amount of fuel supplied is reduced.

The inlet ports 11 to 14 are preferably formed on the combustion chamber 15 in the same way. A variable number of inlet ports can thereby be connected to the fuel supply line 8 and to the outlet line 33 of the electric heating unit 20. A plurality of electric heating units 20 can also be connected.

It is hereby also made simpler to subsequently adapt conventional power plants. For this purpose the electric heating unit 20 is connected to at least one of the available inlet ports.

Figure 2:
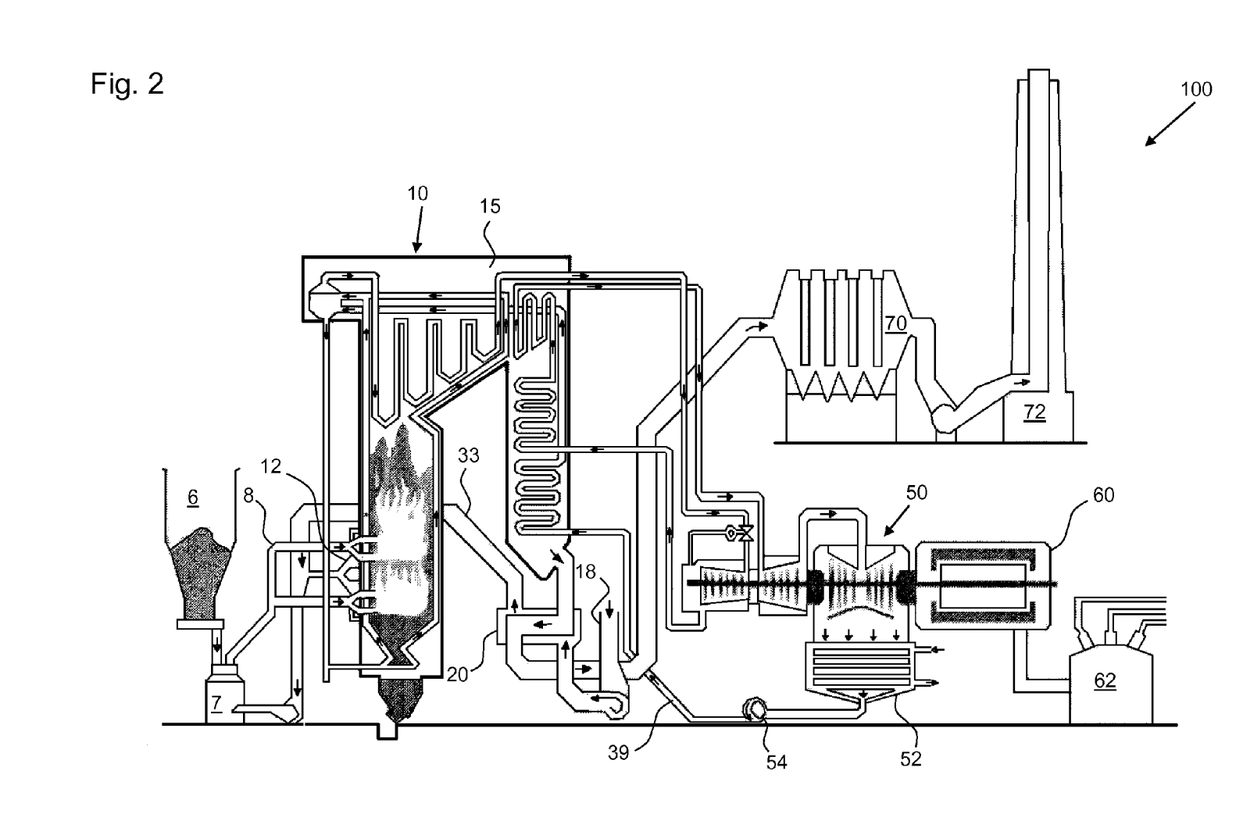
FIG. 2 shows a detailed representation of the power plant of FIG. 1.

A detailed schematic representation of the power plant 100 of FIG. 1 is shown in FIG. 2.

Firstly, a fuel storage element 6 is additionally shown therein. The fuel can be in principle any combustible energy carrier. In the example shown, coal is used. This passes from the fuel storage element 6 into a mill 7. The fuel is ground to powder there. The powder is then introduced via the feed line 8 into the combustion chamber 15.

It is further shown that the turbine unit 50 can comprise a high pressure turbine and one or more subsequent low pressure turbines. The heated medium coming from the combustion chamber 15 passes through the turbine unit 50 and is then conveyed into a condenser 52. From there, the medium is conveyed via a pump 54 through the return line 39 back to the combustion chamber 15.

A transformer 62 is also shown which changes the level of power and voltage of the electrical energy supplied by the generator unit 60.

Finally a precipitation means 70 is also shown, to which an outlet from the combustion chamber 15 leads. A tower 72 follows this, from which waste gases can be expelled.

The electric heating unit 20 can in principle use electrical energy in any desired way to heat a medium. For example, resistive or inductive heating can take place.

Figure 3:
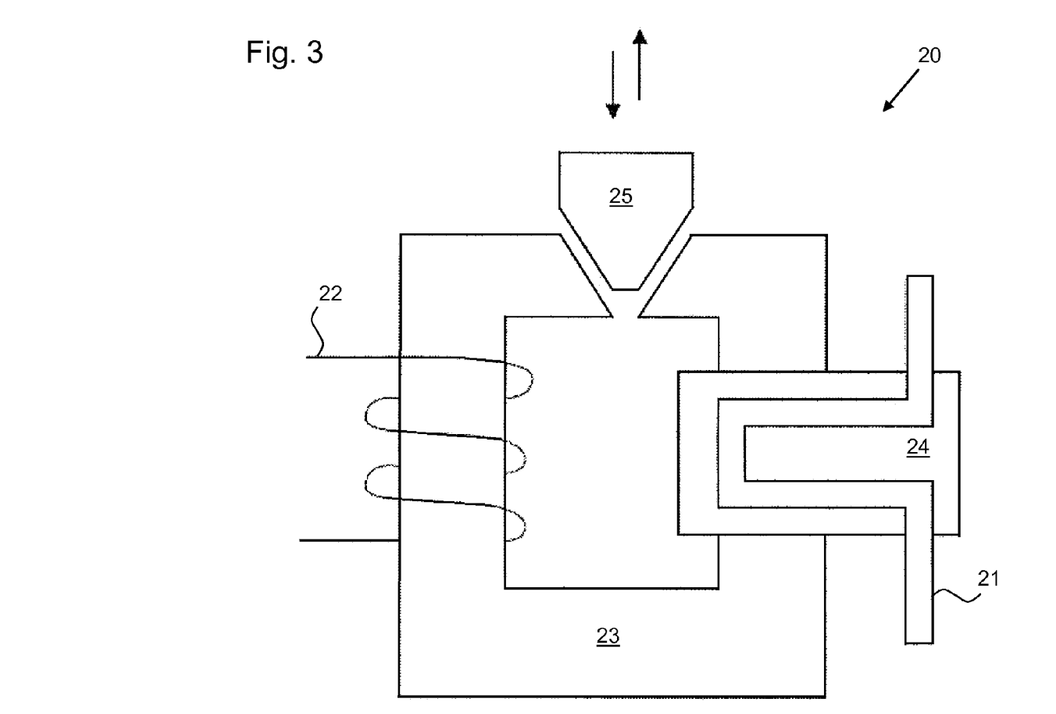
FIG. 3 shows a schematic representation of an electric heating unit of a power plant according to the invention.

FIG. 3 shows schematically an electric heating unit 20 which uses inductive heating. This comprises initially one or more coils 22, to which an alternating voltage is supplied. The magnetic field thereby varying is fed via a conductive material 23, for example iron core 23. A medium to be heated is conveyed through a channel 21 which leads through a heat conducting material 24. A current is induced in the material 24 through the magnetic field and thus produces heat which is transferred to the medium in the channel 21. A cost-effective and rapidly adjustable possibility for converting electrical energy into thermal energy is hereby produced. The rapid adjustment takes place via a switch 25. This can close an air gap in the conductive material 23, whereby the conductive material 23 forms a closed ring. An increased supply of the magnetic field in the conductive material 23 thereby takes place.

Alternatively or additionally, an electric heating unit 20 can be used which is formed with a plasma torch. Space-saving embodiments are hereby possible, with which high temperatures can be reached.

In addition a connection to the combustion chamber 15 can be simplified with plasma torches. In the case of a plasma torch, the outlet line 33 which is shown in FIG. 1 can be omitted. Instead, a plasma torch can be directly attached to one of the inlet ports 13, 14. In particular, heat losses can hereby be avoided and a subsequent adaptation of conventional power plants is possible even with particularly limited space conditions.

Figure 4:
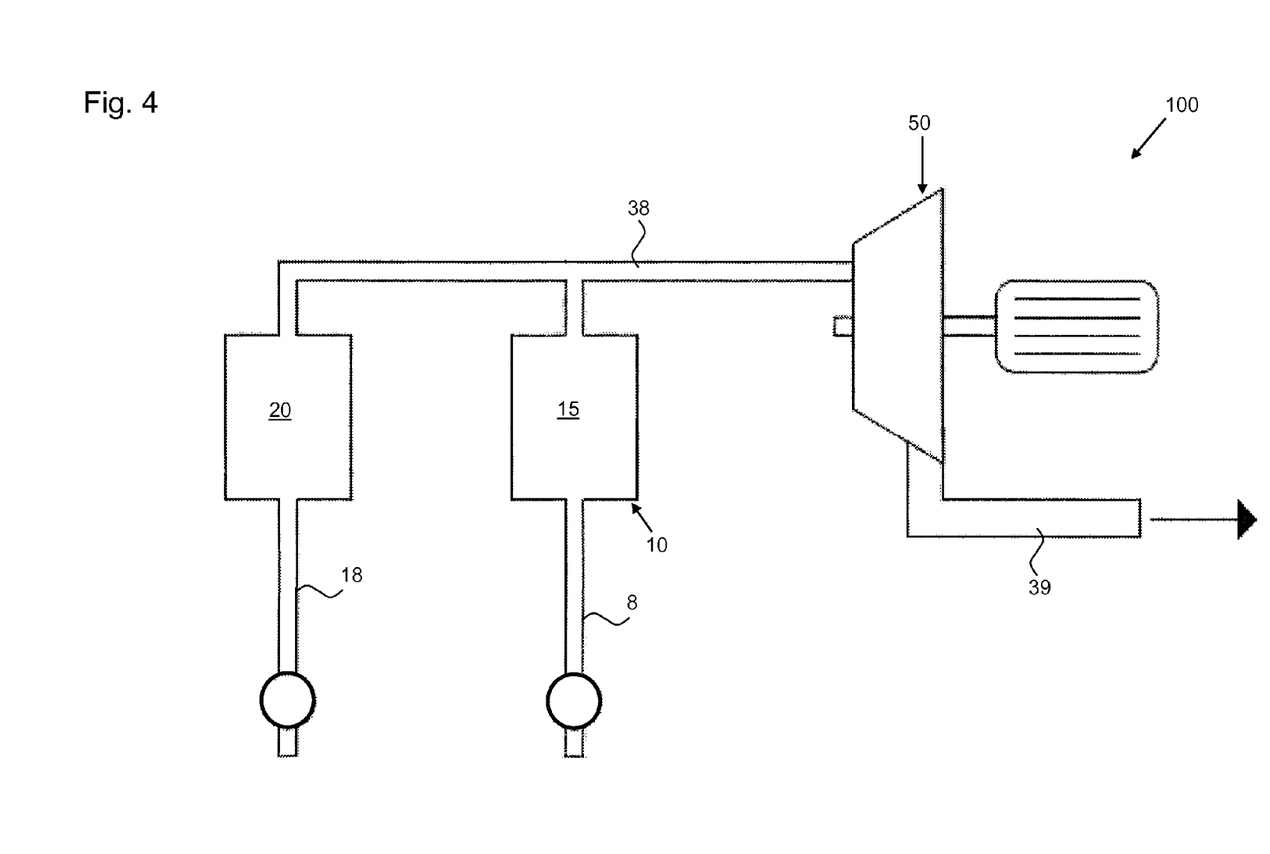
FIG. 4 shows a schematic representation of essential components of a further embodiment of a power plant according to the invention and FIG. 5 shows a schematic representation of an embodiment of a power plant according to the invention with a storage vessel.

FIG. 4 shows schematically a cut-out of an embodiment of a power plant 100 according to the invention. This embodiment is particularly suited for subsequent adaptation of conventional power plants.

The power plant 100 has a burner unit 10 with a combustion chamber 15, a feed line 8 and an outlet line 38. The outlet line 38 leads to a turbine unit 50, followed by a return line 39, in particular to the burner unit 10. These components can be configured as in the case of a conventional power plant.

This embodiment differs from known power plants at least in that an electric heating unit 20 is present, to which a medium to be heated can be conveyed via a feed line 18. A particularly simple subsequent adaptation is achieved by the outlet lines of the combustion chamber 15 and the electric heating unit 20 being brought together to form a joint outlet line 38. The joint outlet line 38 leads to the turbine unit 50. Alterations to conventional power plants can advantageously be essentially limited to the configuration of the outlet line 38 as a joint outlet line 38.

Particular advantages follow if the medium heated by the electric heating unit 20 can initially be stored before it is conveyed to the burner unit or the turbine unit. This is achieved with an embodiment of a power plant according to the invention, of which the essential components are shown schematically in FIG. 5. The outlet line 33 leading from the electric heating unit 20 to the burner unit or the turbine unit has a branch point 31. The medium heated by the electric heating unit 20 can be conveyed from the branch point 31 into a storage vessel 40. Alternatively, the outlet line 33 can also lead exclusively to the storage vessel 40.

Figure 5:
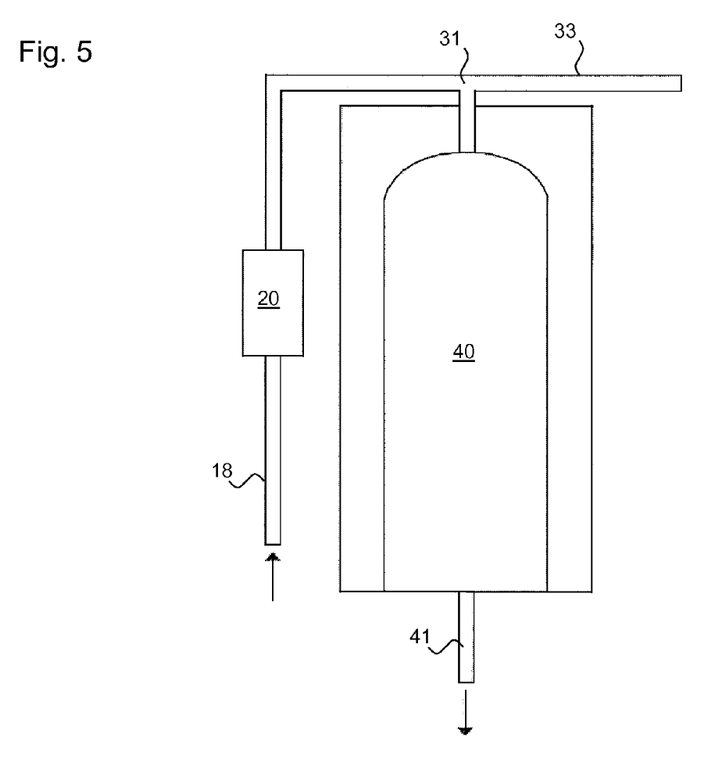

The heated medium can be received in the storage vessel 40 and conveyed via a further outlet line 41 to the burner unit or the turbine unit. In principle it can also be provided that the heated medium is not output from the storage vessel 40 via a further outlet line 41 but instead is conveyed back to the branch point 31.

With the aid of the heated medium in the storage vessel 40, a time span can be bridged, during which the power of the electric heating unit 20 is reduced. This may be the case for example if an over-supply of electrical energy is no longer present.

In this respect, a reaction time is advantageously shortened through the heated medium in the storage vessel 40, this reaction time being the time required for an increase in the amount of heated medium fed to the burner unit or the turbine unit.

It is advantageously facilitated with the power plant according to the invention to vary the amount of fuel supplied to a burner unit very rapidly. This is achieved by additional thermal energy being produced by an electric heating unit. It is thus possible in particular to meaningfully use an over-supply of electrical energy. As a result, the combusted amount of fossil fuels can be reduced. Consequently, $CO_2$ emissions are advantageously also reduced.

The invention claimed is:

1. A power plant for generating electrical power, comprising
    a burner unit, in which thermal energy can be produced by burning a fuel,
    a turbine unit, in which a rotational movement can be produced with the thermal energy, and
    a generator unit which is driven by the rotational movement to generate electrical power,
    wherein
    in order to produce the thermal energy, in addition to the burner unit, an electric heating unit is provided, through which electrical energy can be converted into thermal energy to drive the turbine unit, and
    a control unit is provided which, in the case of an over-supply of electrical energy, increases a heating power of the electric heating unit and reduces a heating power of the burner unit.

2. The power plant of claim 1,
    wherein
    using the control unit, the heating powers of the heating unit and burner unit can be controlled in dependence upon each other, so that the turbine unit can be operated with a substantially constant total power.

3. The power plant of claim 1,
    wherein
    the burner unit has a combustion chamber to burn the fuel,
    the combustion chamber has a plurality of inlet ports,
    a fuel feed line is connected to at least one of the inlet ports, and
    a feed of a medium heated by the electric heating unit is facilitated by means of at least one other of the inlet ports.

4. The power plant of claim 3,
    wherein
    the amount of fuel supplied and the amount of medium heated in the electric heating unit can be controlled in dependence upon each other by the control unit so that a temperature in the combustion chamber is substantially constant.

5. The power plant of claim 1,
wherein
the electrical heating unit comprises a plasma torch to heat a medium, via which the turbine unit can be driven.

6. The power plant of claim 5,
wherein
the plasma torch is arranged on one of a plurality of inlet ports of a combustion chamber of the burner unit.

7. The power plant of claim 1,
wherein
an inlet port for a fuel feed line and an inlet port for a plasma torch are formed similarly.

8. The power plant of claim 1,
wherein
the electric heating unit has induction means to heat a medium and
the induction means can be controlled with the control unit by changing a magnetic resistance on the induction means.

9. The power plant of claim 1,
wherein
a storage vessel is provided in which a medium can be stored which has been heated by the electric heating unit
and
a discharge line is provided, with which the heated medium can be conveyed from the storage vessel to at least one of a combustion chamber of the burner unit and to the turbine unit.

10. The power plant of claim 9,
wherein
the control unit is configured to variably adjust whether a heated medium is conveyed from the electric heating unit to the storage vessel or to the combustion chamber or turbine unit.

11. A power plant for generating electrical power, comprising
a burner unit, in which thermal energy can be produced by burning a fuel,
a turbine unit, in which a rotational movement can be produced with the thermal energy,
a generator unit which is driven by the rotational movement to generate electrical power, and
a control unit,
wherein
in order to produce the thermal energy, in addition to the burner unit, an electric heating unit is provided, through which electrical energy can be converted into thermal energy to drive the turbine unit,
a storage vessel is provided in which a medium can be stored which has been heated by the electric heating unit,
a discharge line is provided, with which the heated medium can be conveyed from the storage vessel to at least one of a combustion chamber of the burner unit and to the turbine unit, and
the control unit is adapted to trigger conveying of the heated medium from the storage vessel in the case of a reduction in a heating power of the electric heating unit below a predefinable threshold value.

12. The power plant of claim 1,
wherein
the burner unit and the electric heating unit respectively have an outlet line,
the two outlet lines are connected to each other to form a joint outlet line,
the joint outlet line leads to the turbine unit.

13. A method for generating electrical power wherein
in a burner unit, a fuel is burnt and thermal energy is produced,
the thermal energy is converted into a rotational movement in a turbine unit, and
a generator unit is driven by the rotational movement and electrical power is hereby produced,
wherein
the thermal energy is produced in addition to the burner unit by an electric heating unit, through which electrical energy is converted into thermal energy to drive the turbine unit, and
in the case of an over-supply of electrical energy, a control unit increases a heating power of the electric heating unit and decreases a heating power of the burner unit.

\* \* \* \* \*